United States Patent
Lei et al.

(10) Patent No.: US 12,105,750 B2
(45) Date of Patent: Oct. 1, 2024

(54) METHOD AND APPARATUS FOR MINING ENTITY RELATIONSHIP, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Qian Lei, Beijing (CN); Zhuang Xiong, Beijing (CN); Houqing Yao, Beijing (CN); Peng Shi, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 81 days.

(21) Appl. No.: 17/216,008

(22) Filed: Mar. 29, 2021

(65) Prior Publication Data
US 2021/0406299 A1 Dec. 30, 2021

(30) Foreign Application Priority Data
Jun. 30, 2020 (CN) .......................... 202010620947.8

(51) Int. Cl.
*G06F 16/25* (2019.01)
*G06F 16/33* (2019.01)
(Continued)

(52) U.S. Cl.
CPC ........ *G06F 16/367* (2019.01); *G06F 16/3334* (2019.01); *G06F 40/284* (2020.01); *G06F 40/289* (2020.01)

(58) Field of Classification Search
CPC .......... G06N 20/00; G06N 5/022; G06N 5/02; G06F 16/903; G06F 16/9538; G06F 8/65;
(Continued)

(56) References Cited

U.S. PATENT DOCUMENTS 10,276,170 B2* 4/2019 Gruber ................. G06F 3/167
10,896,222 B1* 1/2021 Christodoulopoulos ....................
G06F 40/30
(Continued)

FOREIGN PATENT DOCUMENTS

CN 111091006 A 5/2020
CN 111274815 A 6/2020
(Continued)

OTHER PUBLICATIONS

European Search Report related to EP21165945.3-1213 reported on Apr. 19, 2021.
(Continued)

*Primary Examiner* — Tony Mahmoudi
*Assistant Examiner* — Linh Black
(74) *Attorney, Agent, or Firm* — von Briesen & Roper, s.c.

(57) ABSTRACT

A method for mining an entity relationship, apparatus, electronic device, and a storage medium are provided. An implementation of the method may include: searching, in a query statement set, for a query statement satisfying a preset condition corresponding to a target entity word; in response to at least one query statement satisfying the preset condition corresponding to the target entity word being found in the query statement set, mining an associated entity word corresponding to the target entity word based on the found at least one query statement satisfying the preset condition corresponding to the target entity word.

16 Claims, 4 Drawing Sheets

(51) Int. Cl.
*G06F 16/36* (2019.01)
*G06F 40/284* (2020.01)
*G06F 40/289* (2020.01)

(58) Field of Classification Search
CPC .. G06F 16/338; G06F 16/35; G06F 16/24578;
G06F 16/248; G06F 16/367; G06F 40/30;
G06F 16/25; G16H 50/70
USPC ....... 707/603, 727, 749–750, 759, 766, 778,
707/781, 786, E17.048, E17.102
See application file for complete search history.

(56) References Cited

U.S. PATENT DOCUMENTS

| | | | | |
|---|---|---|---|---|
| 11,031,009 | B2* | 6/2021 | Shalaby | G10L 15/18 |
| 11,055,356 | B2* | 7/2021 | Ritchey | G06N 20/00 |
| 11,222,052 | B2* | 1/2022 | Hertz | G06K 9/6259 |
| 11,321,536 | B2* | 5/2022 | Galitsky | G06F 40/35 |
| 11,328,016 | B2* | 5/2022 | Galitsky | G06F 40/289 |
| 11,455,494 | B2* | 9/2022 | Galitsky | G06N 5/043 |
| 11,625,620 | B2* | 4/2023 | Singaraju | G06N 5/022 |
| | | | | 706/14 |
| 2007/0061802 | A1* | 3/2007 | Tan | A63F 13/45 |
| | | | | 717/174 |
| 2010/0124986 | A1* | 5/2010 | Van Luchene | A63F 13/35 |
| | | | | 463/43 |
| 2011/0208730 | A1* | 8/2011 | Jiang | G06F 16/951 |
| | | | | 707/738 |
| 2011/0230258 | A1* | 9/2011 | Van Luchene | A63F 13/77 |
| | | | | 463/43 |
| 2011/0258049 | A1* | 10/2011 | Ramer | G06Q 30/0273 |
| | | | | 705/14.69 |
| 2012/0004038 | A1* | 1/2012 | Van Luchene | G07F 17/3274 |
| | | | | 463/42 |
| 2012/0191716 | A1* | 7/2012 | Omoigui | H01L 27/14647 |
| | | | | 707/E17.069 |
| 2012/0302337 | A1* | 11/2012 | Thakkar | A63F 13/12 |
| | | | | 463/31 |
| 2012/0317088 | A1* | 12/2012 | Pantel | G06F 16/972 |
| | | | | 707/706 |
| 2013/0104251 | A1* | 4/2013 | Moore | G06F 21/6254 |
| | | | | 726/30 |
| 2013/0144605 | A1* | 6/2013 | Brager | G06F 16/30 |
| | | | | 704/9 |
| 2014/0172564 | A1* | 6/2014 | Alon | G06Q 30/0251 |
| | | | | 705/14.54 |
| 2014/0188462 | A1* | 7/2014 | Zadeh | G06T 7/12 |
| | | | | 704/9 |
| 2014/0236570 | A1* | 8/2014 | Heck | G06F 16/3329 |
| | | | | 704/9 |
| 2015/0286747 | A1* | 10/2015 | Anastasakos | G06F 16/9535 |
| | | | | 707/776 |
| 2016/0071355 | A1* | 3/2016 | Morrison | G07F 17/326 |
| | | | | 463/31 |
| 2016/0317933 | A1* | 11/2016 | Shoshan | A63F 13/422 |
| 2016/0328443 | A1* | 11/2016 | Abraham | G06F 16/24524 |
| 2017/0249399 | A1* | 8/2017 | Hu | G06F 16/9535 |
| 2018/0097841 | A1* | 4/2018 | Stolarz | G06N 20/00 |
| 2018/0182381 | A1* | 6/2018 | Singh | G06Q 30/0202 |
| 2018/0210913 | A1* | 7/2018 | Beller | G06F 16/9024 |
| 2019/0005395 | A1* | 1/2019 | Dutkowski | G06T 11/206 |
| 2019/0138595 | A1* | 5/2019 | Galitsky | G06N 5/041 |
| 2019/0171438 | A1* | 6/2019 | Franchitti | G06F 16/903 |
| 2019/0213498 | A1* | 7/2019 | Adjaoute | G06N 3/126 |
| 2019/0278777 | A1* | 9/2019 | Malik | G06F 16/24578 |
| 2019/0354544 | A1* | 11/2019 | Hertz | G06N 5/00 |
| 2019/0364302 | A1* | 11/2019 | Perlman | H04N 19/436 |
| 2020/0101383 | A1* | 4/2020 | Hwang | A63F 13/215 |
| 2020/0167145 | A1* | 5/2020 | Franchitti | H04L 67/34 |
| 2020/0184278 | A1* | 6/2020 | Zadeh | G06K 9/6264 |
| 2020/0327378 | A1* | 10/2020 | Smith | G06V 40/20 |
| 2020/0401938 | A1* | 12/2020 | Etkin | G16H 50/30 |
| 2021/0101068 | A1* | 4/2021 | Wanke | H04L 51/52 |
| 2021/0173874 | A1* | 6/2021 | Giddings | G06N 20/00 |
| 2021/0319780 | A1* | 10/2021 | Aher | G10L 25/63 |

FOREIGN PATENT DOCUMENTS

| | | |
|---|---|---|
| JP | 1990153474 A | 6/1990 |
| JP | 2006127325 A | 5/2006 |

OTHER PUBLICATIONS

Xuanhui Wang, ChengXiang Zhai, "Mining Term Association Patterns from Search Logs for Effective Query Reformulation", University of Illinoise at Urbana-Chanpaign, Urbana, IL, USA.

Q&A related to Japanese Application No. 2021-053538; reported on Nov. 15, 2022.

* cited by examiner

METHOD AND APPARATUS FOR MINING ENTITY RELATIONSHIP, ELECTRONIC DEVICE, AND STORAGE MEDIUM

CROSS-REFERENCE TO RELATED APPLICATIONS

This application claims priority to Chinese Patent Application No. 202010620947.8, filed with the China National Intellectual Property Administration (CNIPA) on Jun. 30, 2020, the content of which is incorporated herein by reference in its entirety.

TECHNICAL FIELD

The present disclosure relates to the field of computer technology, particularly to the fields of artificial intelligence and deep learning, and more particularly to a method and apparatus for mining an entity relationship, electronic devices, and a storage medium.

BACKGROUND

In general, most of the user's search requirements are objective knowledge-based requirements. In order to make users more satisfied, the search engine needs to understand the requirements of the users deeply when the search engine provides search services for the users, to satisfy different demands of users for different demands scenarios. In the search scenarios of objective knowledge-based requirements, in addition to deep understanding on the needs, needs form, and the like, deep understanding of the insight of knowledge is also included, including the classification level of knowledge, the connotation and extension of knowledge, and the key requirements of the knowledge for the users. A deep understanding on knowledge points the is great helpful to improve the search and recommendation users experiences.

In the deep understanding on knowledge points, it is to a large extent referred to the classification and construction hierarchy of knowledge, for example, in the academic classification system of plants and animals, the classification hierarchy of "orchids" is: Botanica->angiosperm phyla>monocotyledonous botanica->microneedles>orchids>orchidoideae>Epidendreae>Orchid genus; For another example, in a subject classification system, the classification level of a "random variable" is: Mathematical->probability theory->basic concepts. The user can learn more about the knowledge points by tracing back through the upper level, or spreading out horizontally. However, in the existing classification system, usually there is a problem that the granularity is large. Generally the classification system takes an entity word as a leaf node and stops searching. However, in the actual search scenario, the users have further hierarchical requirements for the entity words, for example, in the game "king in turbulent days", the users' requirements may be concentrated on the lower level content of the game entity such as "white tiger", "war of Changping", "arms," rather stops at the "king in turbulent days" itself;

SUMMARY

Embodiments of the present disclosure provide a method and apparatus for mining an entity relationship, electronic device, and a storage medium. The method can mine out relationships between different entity words more accurately, thereby satisfying search requirements of users, and achieving the purpose of saving labor cost and improving mining efficiency.

In a first aspect, some embodiments of the present disclosure provide a method for mining an entity relationship. The method includes: searching, in a query statement set, for a query statement satisfying a preset condition corresponding to a target entity word; in response to at least one query statement satisfying the preset condition corresponding to the target entity word being found in the query statement set, mining an associated entity word corresponding to the target entity word based on the found at least one query statement satisfying the preset condition corresponding to the target entity word.

In a second aspect, some embodiments of the present disclosure provide an apparatus for mining an entity relationship. The apparatus includes a searching module and a mining module, where the searching module is configured to search, in a query statement set, for a query statement satisfying a preset condition corresponding to a target entity word; and the mining module is configured to, in response to at least one query statement satisfying the preset condition corresponding to the target entity word being found in the query statement set, mine an associated entity word corresponding to the target entity word based on the found at least one query statement satisfying the preset condition corresponding to the target entity word.

In a third aspect, some embodiments of the present disclosure provide an electronic device. The electronic device includes at least one processor, and a memory in communication with the at least one processor, where the memory stores instructions executable by at least one processor, the instructions, when executed by the at least one processor, cause the at least one processor to perform the method according to any one of embodiments of the first aspect.

In a fourth aspect, some embodiments of the present disclosure provide a non-transitory computer-readable storage medium, storing computer instructions thereon, wherein the computer instructions, when executed by a processor, cause the processor to perform the method according to any one of embodiments of the first aspect.

It is to be understood that the description in this section is not intended to identify key or critical features of embodiments of the disclosure, nor is it intended to limit the scope of the disclosure. Other features of the present disclosure will become readily apparent from the following description.

BRIEF DESCRIPTION OF THE DRAWINGS

The drawings are intended to provide a better understanding of embodiments of the present disclosure and are not to be construed as limiting the scope of the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Embodiment 1

Figure 1:
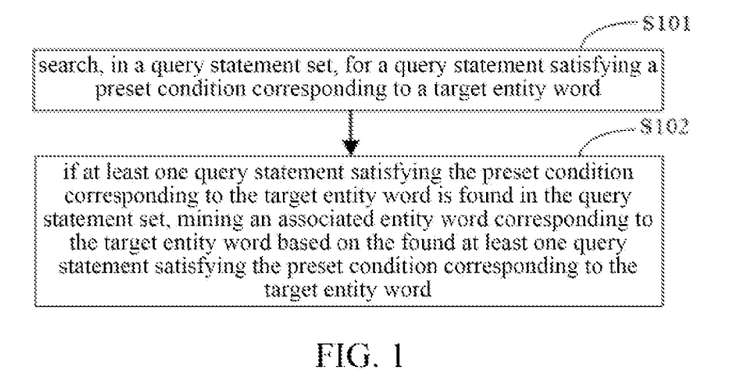
FIG. 1 is a schematic flowchart of an method for mining an entity relationship according to embodiment 1 of the present disclosure.

FIG. 1 is a schematic flowchart of an method for mining an entity relationship according to embodiment 1 of the present disclosure. Embodiments of the present disclosure may be performed by an apparatus for mining an entity relationship or an electronic device, which may be implemented in software and/or hardware. The apparatus or the electronic devices may be integrated in any intelligent devices having a network communication function. As shown in FIG. 1, the method for mining an entity relationship may include the following steps:

S101, search, in a query statement set, for a query statement satisfying a preset condition corresponding to a target entity word.

In an embodiment of the present disclosure, the electronic device may search for a query statement which satisfies a preset condition corresponding to a target entity word in a query statement set. The electronic device may search for a query statement which satisfies the preset condition corresponding to target entity word in a query statement set according to a preset period. In an embodiment, the electronic device may first search for the target entity word in the query statement set; if at least one query statement including the target entity is found in the query statement set, the electronic device may further detect whether there is at least one query statement satisfying a sentence structure condition corresponding to the target entity word in the found query statement including the target entity word; if there is at least one query statement satisfying the sentence structure condition corresponding to the target entity word in the found query statement including the target entity word, the electronic device may determine that the query statement which satisfies the preset condition corresponding to the target entity word is found in the query statement set; If no query statement including the target entity is found in the query statement set; Alternatively, if there is no query statement satisfying the sentence structure condition corresponding to the target entity word in the found query statement including the target entity word, the electronic device may determine that no query statement satisfying the preset condition corresponding to the target entity word is found in the query statement set.

S102, in response to at least one query statement satisfying the preset condition corresponding to the target entity word being found in the query statement set, mining an associated entity word corresponding to the target entity word based on the found at least one query statement satisfying the preset condition corresponding to the target entity word.

In an embodiment of the present disclosure, if at least one query statement satisfying the preset condition corresponding to the target entity word is found in the query statement set, the electronic device may extract an associated entity word corresponding to the target entity word based on the query statement satisfying the preset condition corresponding to the target entity word. In an embodiment, the electronic device may first mine at least one second level entity word corresponding to the target entity word based on the found query statement satisfying the preset condition corresponding to the target entity word; merge the target entity word and each second level entity word corresponding to the target entity word into a new target entity word, and search, in the query statement set, for a query statement satisfying a preset condition corresponding to the new target entity word; if at least one query statement satisfying the preset condition corresponding to the new target entity word is found in the query statement set, the electronic device may mine a third level entity word corresponding to the target entity word based on the found query statement satisfying the preset condition corresponding to the new target entity word.

According to the method for mining an entity relationship provided in embodiments of the present disclosure: searching, in a query statement set, for a query statement satisfying a preset condition corresponding to a target entity word; in response to at least one query statement satisfying the preset condition corresponding to the target entity word being found in the query statement set, mining an associated entity word corresponding to the target entity word based on the found at least one query statement satisfying the preset condition corresponding to the target entity word. That is, embodiments of the present disclosure may mine associated entity words corresponding to the target entity word from the query statement set. In existing methods for mining an entity relationship, a large amount of labor operation needs to be performed in the manual method, and the cost is too high; the use of high frequency tagging is highly dependent on the tags. Because embodiments of the present disclosure adopt the technical means of mining a target entity word in the query statement set, and overcome the technical problems in the prior art such as a large amount of labor operation needs to be performed in a manual method and the cost thereof is high, while high frequency tagging manner relies heavily on tags. The technical solution provided by embodiments of the present disclosure can mine the relationship between different entity words more accurately, thereby satisfying search requirements of users, and achieving the purpose of saving labor cost and improving mining efficiency. Moreover, the technical solution of embodiments of the present disclosure is simple and convenient to implement, convenient to popularize, and has a wider application range.

Embodiment 2

Figure 2:
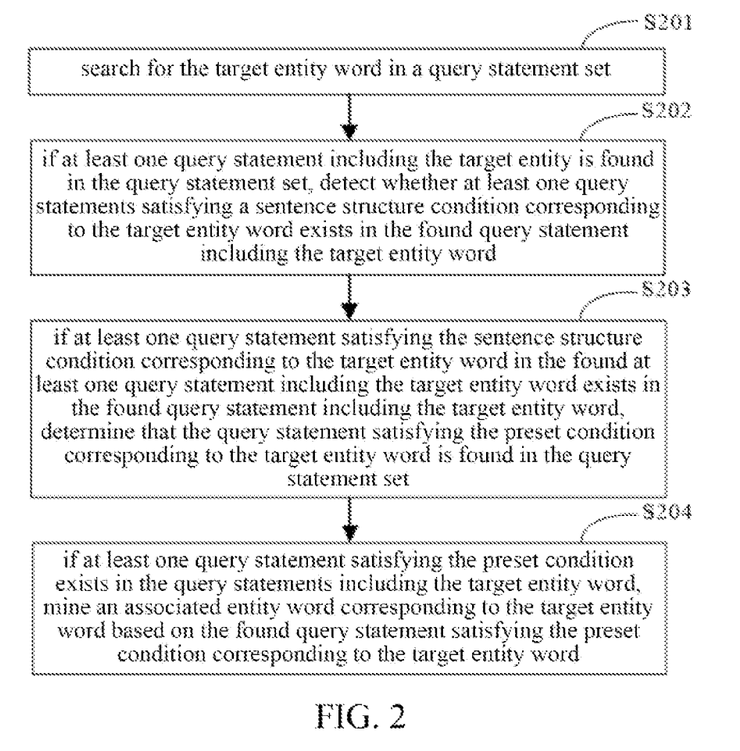
FIG. 2 is a schematic flowchart of an method for mining an entity relationship according to embodiment 2 of the present disclosure.

FIG. 2 is a schematic flowchart of an method for mining an entity relationship according to embodiment 2 of the present disclosure. As shown in FIG. 2, the method for mining an entity relationship may include the following steps:

S201, search for the target entity word in a query statement set.

In an embodiment of the present disclosure, the electronic device may search for the target entity word in the query statement set. The electronic device may search for the target entity word in the query statement set according to a preset period. A query statement set is a pre-constructed complete query set, which may include N queries, where N is a natural number greater than or equal to 1.

S202, if at least one query statement including the target entity is found in the query statement set, detect whether there is at least one query statements satisfying a sentence structure condition corresponding to the target entity word in the found query statement including the target entity word.

In an embodiment of the present disclosure, if at least one the query statement including the target entity word is found in the query statement set, the electronic device may detect whether there is at least one query statement satisfying the sentence structure condition corresponding to the target entity word in the query statement including the target entity word. In an embodiment, the electronic device may extract, from the at least one query statement including the target entity word, a query statement as a current query statement including the target entity word; If the first noun in the current query statement including the target entity word is the target entity word and there is only one noun following the target entity word, the electronic device may determine that the current query statement including the target entity word is a query statement satisfying the sentence structure condition corresponding to the target entity word; Otherwise, the electronic device may determine that the current query statement including the target entity word is a query statement that does not satisfy the sentence structure condition corresponding to the target entity word; the electronic device may repeat the operation mentioned above until whether each of the at least one query statement including the target entity word satisfies the sentence structure condition corresponding to the target entity word is detected.

S203, if there is at least one query statement satisfying the sentence structure condition corresponding to the target entity word in the found at least one query statement including the target entity word, determine that the query statement satisfying the preset condition corresponding to the target entity word is found in the query statement set.

In an embodiment of the present disclosure, if at least one query statement satisfying the sentence structure condition corresponding to the target entity word exists in the found at least one query statement including the target entity word, the electronic device may determine that the query statement satisfying the preset condition corresponding to the target entity word is found in the query statement set; if no query statement satisfying the sentence structure condition corresponding to the target entity word exists in the found at least one query statement including the target entity word, the electronic device may determine that no query statement satisfying the preset condition corresponding to the target entity word is found in the query statement set.

S204, if at least one query statement satisfying the preset condition exists in the query statements including the target entity word, mine an associated entity word corresponding to the target entity word based on the query statement satisfying the preset condition corresponding to the target entity word.

According to the method for mining an entity relationship provided in embodiments of the present disclosure, a query statement satisfying the preset condition corresponding to the target entity word is first searched in a query statement set; if at least one query statement satisfying the preset condition corresponding to the target entity word is found in the query statement set, an associated entity word corresponding to the target entity word is mined out based on the query statements satisfying the preset condition corresponding to the target entity word. That is, embodiments of the present disclosure may mine an associated entity word corresponding to the target entity word from the query statement set. In the existing method for mining an entity relationship, a large amount of labor operation needs to be performed in the manual method, and the cost is too high; the use of high frequency tagging is highly dependent on the tags. Because embodiments of the present disclosure adopt the technical means of mining the target entity word based on the query statement set, and overcomes the technical problems in the prior art such as a large amount of labor operation needs to be performed in a manual method and the cost is too high, and high frequency tags manner relies heavily on tags. The technical solution provided by embodiments of the present disclosure may mine out the relationship between different entity words more accurately, thereby satisfying search requirements of users, and achieving the purpose of saving labor cost and improving mining efficiency. Moreover, the technical solution of embodiments of the present disclosure is simple and convenient to implement, convenient to popularize, and wider in application range.

Embodiment 3

Figure 3:
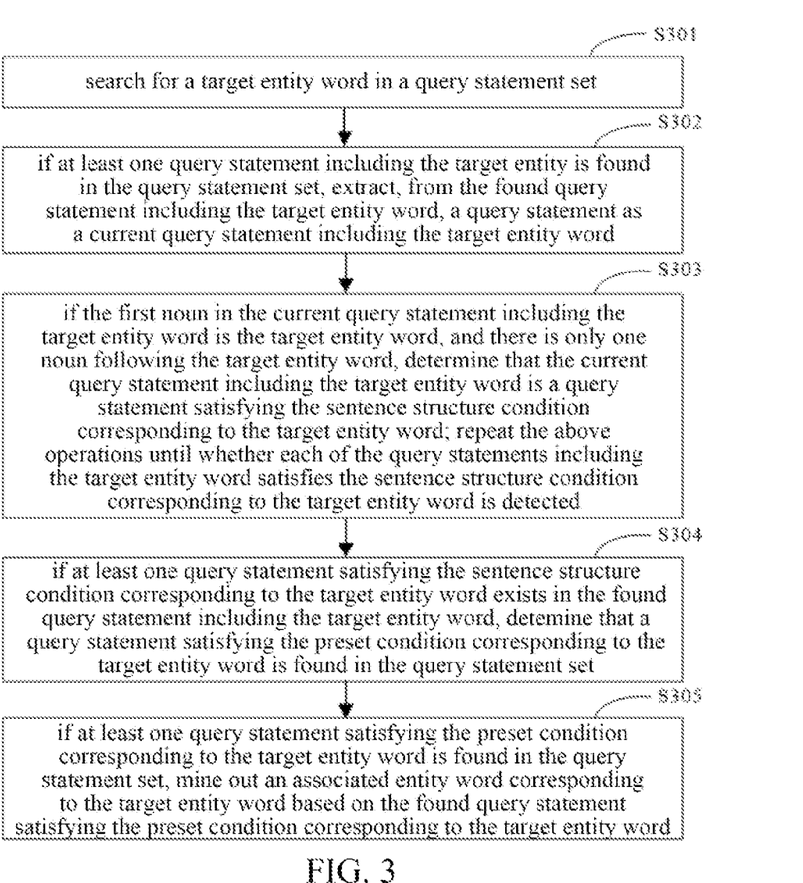
FIG. 3 is a schematic flowchart of an method for mining an entity relationship according to embodiment 3 of the present disclosure.

FIG. 3 is a schematic flowchart of an method for mining an entity relationship according to embodiment 3 of the present disclosure. As shown in FIG. 3, the method for mining an entity relationship may include the following steps:

S301, search for a target entity word in a query statement set.

S302, if at least one query statement including the target entity is found in the query statement set, extract, from the found query statement including the target entity word, a query statement as a current query statement including the target entity word.

In an embodiment of the present disclosure, if at least one query statement containing the target entity is found in the query statement set, the electronic device may extract one query statement, from the found query statements containing the target entity word, as the current query statement containing the target entity word. For example, assuming that three query statements containing the target entity are found in the query statement set, the electronic device may: first use the first query statement containing the target entity as a current query statement; then detect whether the current query statement (i.e., the first query statement containing the target entity) satisfies the sentence structure condition corresponding to the target entity word; then use the second query statement including the target entity as the current query statement; detect whether the current query statement (i.e., the second query statement containing the target entity) satisfies the sentence structure condition corresponding to the target entity word; use the third query statement including the target entity as the current query statement; detect whether the current query statement (i.e., the third query statement containing the target entity) satisfies the sentence structure condition corresponding to the target entity word.

S303, if the first noun in the current query statement including the target entity word is the target entity word, and there is only one noun following the target entity word, determine that the current query statement including the target entity word is a query statement satisfying the sentence structure condition corresponding to the target entity word; repeat the above operation until whether each of the query statements including the target entity word satisfies the sentence structure condition corresponding to the target entity word is detected.

In an embodiment of the present disclosure, if the first noun in the current query statement including the target entity word is the target entity word and there is only one noun following the target entity word, the electronic device may: determine that the current query statement including the target entity word is a query statement satisfying the sentence structure condition corresponding to the target entity word; repeat the above operation until whether each of the query statements including the target entity word satisfies the sentence structure condition corresponding to the target entity word is detected. For example, assuming that the target entity word is "king in turbulent days", and the current query statement is "white tiger of the king in turbulent days", since the first noun in the current query statement is "king in turbulent days", and "white tiger" is the only word which is after "king in turbulent days", the electronic device may determine that the current query statement is a query statement satisfying the sentence structure condition corresponding to the target entity word;

S304, if at least one query statement satisfying the sentence structure condition corresponding to the target entity word exists in the found query statement including the target entity word, determine that a query statement satisfying the preset condition corresponding to the target entity word is found in the query statement set.

In an embodiment of the present disclosure, if at least one query statement satisfying the sentence structure condition corresponding to the target entity word exists in the found query statement including the target entity word, the electronic device may determine that the query statement satisfying the preset condition corresponding to the target entity word is found in the query statement set; if no query statement satisfying the sentence structure condition corresponding to the target entity word exists in the query statement including the target entity word, the electronic device may determine that no query statement satisfying the preset condition corresponding to the target entity word is found in the query statement set.

S305, if at least one query statement satisfying the preset condition corresponding to the target entity word is found in the query statement set, an associated entity word corresponding to the target entity word is mined out based on the found query statement satisfying the preset condition corresponding to the target entity word.

Figure 4:
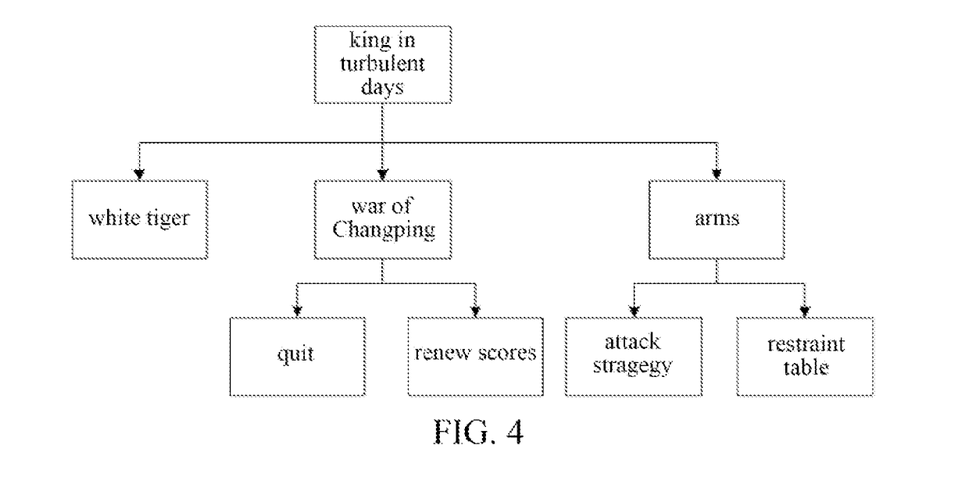
FIG. 4 is a schematic diagram of a structure of the entity layers according to embodiment 3 of the present disclosure.

FIG. 4 is a schematic diagram of a structure of the entity layers provided in embodiment 3 of the present disclosure. As shown in FIG. 4, assuming that the target entity word is "king in turbulent days", the electronic device may find, in the query statement set, the query statement including the target entity word "king in turbulent days," the found query statement may include "white tiger of the king in turbulent days", "war of Changping of the king in turbulent days", and "arms of the king in turbulent days". Then the electronic device may mine, from the above-mentioned query statements including the target entity word "king in turbulent days", the second level entity words as "white tiger", "war of Changping", and "arms," which correspond to the target entity word "king in turbulent days"; The electronic device may merge the "king in turbulent days" and the "white tiger" into a new target entity word, and search for the new target entity word in the query statement set. If the new target entity word is not found in the query statement set, then there is no entity word of lower level for the "white tiger". Similarly, the electronic device may also merge the "king in turbulent days" and the"war of Changping" into a new target entity word, and search the new target entity word in the query statement set. If query statements containing the new target entity word, such as "quit from the war of Changping of the king in turbulent days" and "renew scores of the war of Changping of king in turbulent days," are found in the query statement set, then based on the two query statements, the "quit" and "renew scores" may be mined out as the entity words of the lower level for the second level entity word "war of Changping". Similarly, the electronic device may also mine out that the lower level entity words for the second level word "arms" includes "attack strategy" and "restraint table".

According to the method for mining an entity relationship according to the embodiment of the present disclosure, a query statement satisfying a preset condition corresponding to target entity word is searched in the query statement set first; if at least one query statement satisfying the preset condition corresponding to the target entity word is found in the query statement set, an associated entity word corresponding to the target entity word is mined out based on the query statement satisfying the preset condition corresponding to the target entity word. That is, embodiments of the present disclosure can mine out an associated entity word corresponding to the target entity word in the query statement set. In the existing method for mining an entity relationship, a large amount of labor operation needs to be performed in the manual method, and the cost is too high; the use of high frequency tagging is highly dependent on the tags. Because embodiments of the present disclosure adopt the technical means of mining the target entity word based on the query statement set, and overcomes the technical problems in the prior art such as a large amount of labor operation needs to be performed in a manual method and the cost is too high, and high frequency tags manner relies heavily on tags. The technical solution provided by embodiments of the present disclosure may mine out the relationship between different entity words more accurately, thereby satisfying search requirements of users, and achieving the purpose of saving labor cost and improving mining efficiency. Moreover, the technical solution of embodiments of the present disclosure is simple and convenient to implement, convenient to popularize, and wider in application range.

Embodiment 4

Figure 5:
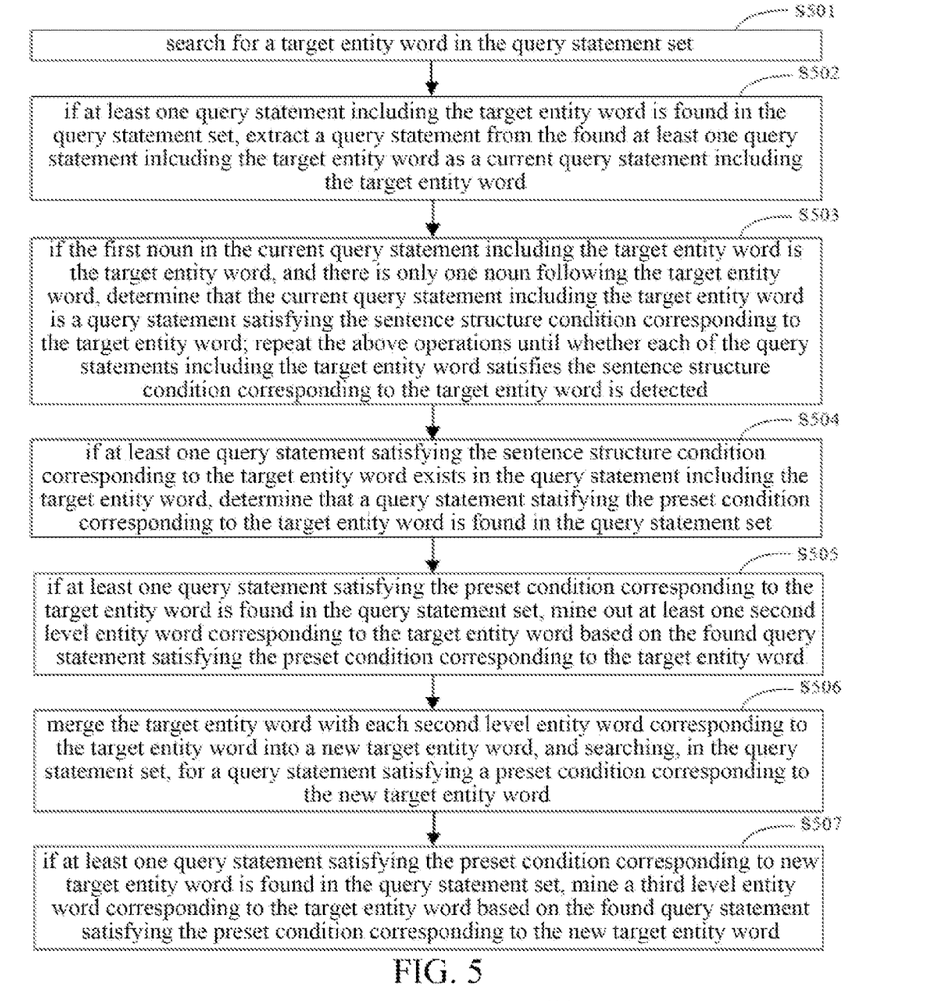
FIG. 5 is a schematic flowchart of an method for mining an entity relationship according to embodiment 4 of the present disclosure.

FIG. 5 is a schematic flowchart of a method for mining an entity relationship according to embodiment 4 of the present disclosure. As shown in FIG. 5, the method for mining an entity relationship may include the following steps:

S501, search for a target entity word in the query statement set.

S502, if at least one query statement including the target entity word is found in the query statement set, extract a query statement from the found at least one query statement including the target entity word as a current query statement including the target entity word.

S503, if the first noun in the current query statement including the target entity word is the target entity word, and there is only one noun following the target entity word, determine that the current query statement including the target entity word is a query statement satisfying the sentence structure condition corresponding to the target entity word; repeat the above operations until whether each of the query statements including the target entity word satisfies the sentence structure condition corresponding to the target entity word is detected.

S504, if at least one query statement satisfying the sentence structure condition corresponding to the target entity word exists in the query statement including the target entity word, determine that a query statement satisfying the preset condition corresponding to the target entity word is found in the query statement set.

S505, if at least one query statement satisfying the preset condition corresponding to the target entity word is found in the query statement set, mine at least one second level entity word corresponding to the target entity word based on the found query statement satisfying the preset condition corresponding to the target entity word.

In an embodiment of the present disclosure, if at least one query statement satisfying the preset condition corresponding to the target entity word is found in the query statement set, the electronic device may mine at least one second level entity word corresponding to the target entity word based on the found query statements satisfying the preset condition corresponding to the target entity word. In an embodiment, the electronic device may: first extract a query statement, from the found at least one query statement satisfying the preset condition corresponding to the target entity word, as a current query statement satisfying the preset condition corresponding to the target entity word; then based on the current query statement satisfying the preset condition corresponding to the target entity word, a second level entity word corresponding to the target entity word; repeat the above operations until at least one second level entity word corresponding to the target entity word are mined out from each of the query statements satisfying the preset condition corresponding to the target entity word.

S506, merge the target entity word with each second level entity word corresponding to the target entity word into a new target entity word, and searching, in the query statement set, for a query statement satisfying a preset condition corresponding to the new target entity word.

In an embodiment of the present disclosure, the electronic device may merge the target entity word with each second level entity word corresponding to the target entity word into a new target entity word, and searching, in the query statement set, for a query statement satisfying a preset condition corresponding to the new target entity word. The electronic device may directly combine the target entity word and each of the second level entity words corresponding to the target entity word, or may add predetermined function words, for example, an adverb, a preposition, a conjunction, an auxiliary word, or the like, between the target entity word and each of the second level entity words corresponding to the target entity word. In an embodiment, the electronic device may search for the new target entity word in the query statement set; if at least one query statement including the new target entity word is found in the query statement set, the electronic device detects whether at least one query statement satisfying a sentence structure condition corresponding to the new target entity word exists in the found at least one query statement including the new target entity word; if at least one query statement which satisfies the sentence structure condition corresponding to the new target entity word exists in the found at least one query statements including the new target entity word, the electronic device may determine that the query statements which satisfies the preset condition corresponding to the new target entity word are found in the query statement set. Further, the electronic device may extract a query statement, from the found query statements including the new target entity word, as a current query statement including new target entity word; if the first noun in the current query statement including the new target entity word is the new target entity word and there is only one noun or one verb following the new target entity word, the electronic device may determine that the current query statement including the new target entity word is a query statement satisfying the sentence structure condition corresponding to the new target entity word; repeat the above operations until all of the query statements which satisfies the sentence structure corresponding to the new target entity word are extracted from the at least one query statement including the new target entity word.

S507, if at least one query statement satisfying the preset condition corresponding to new target entity word is found in the query statement set, mine a third level entity word corresponding to the target entity word based on the found query statement satisfying the preset condition corresponding to the new target entity word.

In an embodiment of the present disclosure, if at least one query statement satisfying the preset condition corresponding to the new target entity word is found in the query statement set, the electronic device may mine, based on the found query statement satisfying the preset condition corresponding to the new target entity word, a third level entity word corresponding to the target entity word. For example, assuming that the target entity word is "king in turbulent days", the electronic device may find, in the query statement set, the query statement including "king in turbulent days," and the found query statements may include "war of Changping of the king in turbulent days". Then, the electronic device may mine, from the found query statement "war of Changping of the king in turbulent days," the word "war of Changping" as a second level word corresponding to the target entity word "king in turbulent days". The electronic device may then merge the "king in turbulent days" and "war of Changping" into a new target entity word, search for the new target entity word in the query statement set, if the query statements including the new target entity word, such as "recommendation of war of Changping of the king in turbulent days" and "renew scores of war of Changping of the king in turbulent days," are found in the query statement set, based on the above found two query statements, "quit" and "renew scores" may be mined out as the the entity words of lower level for the second level entity word "war of Changping".

Preferably, in an embodiment of the present disclosure, after associated entity words corresponding to the target entity word are mined out, the electronic device may also perform verification on the associated entity words corresponding to the target entity word. In an embodiment, the electronic device may: extract an entity word from the associated entity words corresponding to the target entity word as a current associated entity word corresponding to the target entity word; then count an access frequency or a number of access times of the target entity word and the current associated entity word corresponding to the target entity word in a predetermined time period; if the access frequency of the target entity word and the current associated entity word corresponding to the target entity word within a predetermined time period is greater than predetermined frequency threshold, or if the number of access times of the target entity word and the current associated entity words corresponding to the target entity word within a predetermined time period is greater than a preset number of times threshold, the electronic device may determine that the current associated entity words corresponding to the target entity word is valid; repeat the above operations until whether each of the associated entity words corresponding to the target entity word is valid is verified.

According to the method for mining an entity relationship provided in the embodiment of the present disclosure, a query statement satisfying the preset condition corresponding to target entity word is searched in a query statement set first; If at least one query statement satisfying the preset condition corresponding to the target entity word is found in the query statement set, an associated entity word corresponding to the target entity word is mined out based on the found query statements satisfying the preset condition corresponding to the target entity word. That is, embodiments of the present disclosure can mine out the associated entity words corresponding to the target entity word in the query statement set. In the existing method for mining an entity relationship, a large amount of labor operation needs to be performed in the manual method, and the cost is too high; the use of high frequency tagging is highly dependent on the tags. Because embodiments of the present disclosure adopt the technical means of mining the target entity word based on the query statement set, and overcomes the technical problems in the prior art such as a large amount of labor operation needs to be performed in a manual method and the cost is too high, and high frequency tags manner relies heavily on tags. The technical solution provided by embodiments of the present disclosure may mine out the relationship between different entity words more accurately, thereby satisfying search requirements of users, and achieving the purpose of saving labor cost and improving mining efficiency. Moreover, the technical solution of embodiments of the present disclosure is simple and convenient to implement, convenient to popularize, and wider in application range.

Embodiment 5

Figure 6:
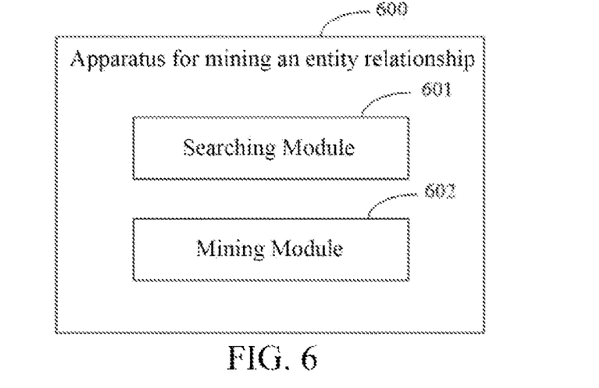
FIG. 6 is a schematic flowchart of an method for mining an entity relationship according to embodiment 5 of the present disclosure.

FIG. 6 is a schematic flowchart of an apparatus for mining an entity relationship according to embodiment 5 of the present disclosure. As shown in FIG. 6, the apparatus 600 includes a searching module 601 and a mining module 602.

The searching module 601 is configured to search, in a query statement set, for a query statement satisfying a preset condition corresponding to a target entity word;

The mining module 602 is configured to, in response to at least one query statement satisfying the preset condition corresponding to the target entity word being found in the query statement set, mine an associated entity word corresponding to the target entity word based on the found at least one query statement satisfying the preset condition corresponding to the target entity word.

Figure 7:
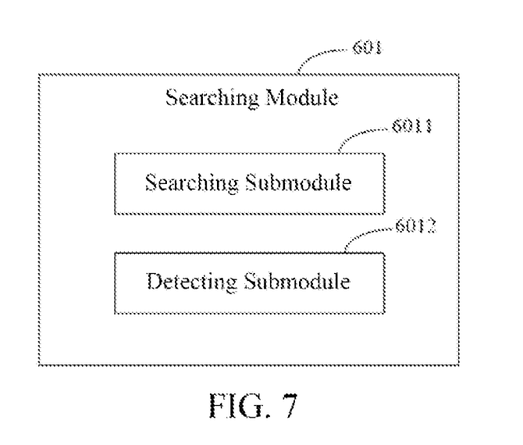
FIG. 7 is a schematic flowchart of a searching module according to embodiment 5 of the present disclosure.

FIG. 7 is a schematic flowchart of a searching module according to embodiment 5 of the present disclosure. As shown in FIG. 7, the searching module 601 includes a searching submodule 6011 and a detecting submodule 6012.

The searching submodule 6011 is configured to search for the target entity word in the query statement set;

The detecting submodule 6012 is configured to, in response to at least one query statement including the target entity word is found in the query statement set, detecting whether there is at least one query statement satisfying a sentence structure condition corresponding to the target entity word in the found at least one query statement including the target entity word; and in response to there being at least one query statement satisfying the sentence structure condition corresponding to the target entity word in the found at least one query statement including the target entity word, determining that the at least one query statement satisfying the preset condition corresponding to the target entity word is found in the query statement set.

Further, the detecting submodule 6012 is configured to: extract, from the at least one query statement including the target entity word, a query statement as a current query statement including the target entity word; in response to a first noun in the current query statement including the target entity word being the target entity word and there being only one noun following the target entity word, determine that the current query statement including the target entity word is a query statement satisfying the sentence structure condition corresponding to the target entity word; repeat the extracting and determining operation until whether each of the at least one query statement including the target entity word satisfies the sentence structure condition corresponding to the target entity word is detected.

Figure 8:
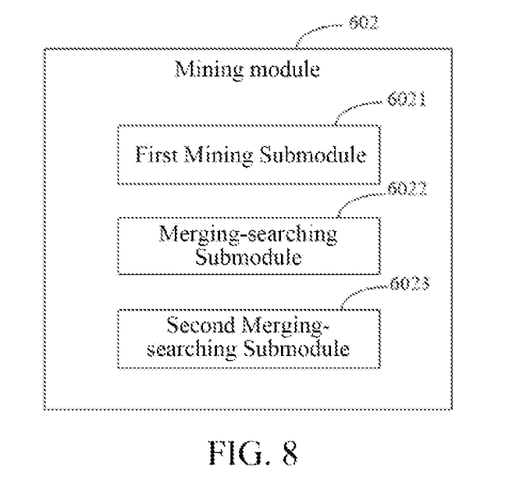
FIG. 8 is a schematic flowchart of a searching module according to embodiment 5 of the present disclosure.

FIG. 8 is a schematic flowchart of a mining module according to embodiment 5 of the present disclosure. As shown in FIG. 8, the mining module 602 includes a first mining submodule 6021, a merging-searching submodule 6022, and a second mining submodule 6023; Wherein, The first mining submodule 6021 is configured to mine at least one second level entity word corresponding to the target entity word based on the found at least one query statement satisfying the preset condition corresponding to the target entity word;

The merging-searching submodule 6022 is configured to merge the target entity word and each second level entity word corresponding to the target entity word into a new target entity word, and searching, in the query statement set, for a query statement satisfying a preset condition corresponding to the new target entity word;

The second merging-searching 6023 is configured to, in response to at least one query statement satisfying the preset condition corresponding to the new target entity word being found in the query statement set, mine a third level entity word corresponding to the target entity word based on the found query statement satisfying the preset condition corresponding to the new target entity word.

Further, the merging-searching submodule 6022 is further configured to: search for the new target entity word in the query statement set; in response to at least one query statement including the new target entity word being found in the query statement set, detect whether there is at least one query statement satisfying a sentence structure condition corresponding to the new target entity word in the found at least one query statement including the new target entity word; in response to there being at least one query statement satisfying the sentence structure condition corresponding to the new target entity word in the found at least one query statement including the new target entity word, determine that the at least one query statement satisfying the preset condition corresponding to the target entity word is found in the query statement set.

Further, the first mining submodule 6021 is further configured to: extract, from the found at least one query statement satisfying the preset condition corresponding to the target entity word, a query statement as a current query statement satisfying the preset condition corresponding to the target entity word; mine a second level entity word corresponding to the target entity word based on the current query statement satisfying the preset condition corresponding to the target entity word; repeat the extracting and mining operation until at least one second level entity word corresponding to the target entity word is mined in each of the query statements satisfying the preset condition corresponding to the target entity word.

Further, the merging-searching submodule 6022 is further configured to: extract, from the at least one query statement including the new target entity word, a query statement as a current query statement including the new target entity word; in response to a first noun in the current query statement including the new target entity word being the new target entity word and there being only one noun or one verb following the new target entity word, determine that the current query statement including the new target entity word is a query statement satisfying the sentence structure condition corresponding to the new target entity word; repeat the extracting and determining operation until all of the query statements satisfying the sentence structure corresponding to the new target entity word are extracted from the at least one query statement including the new target entity word.

Further, the apparatus further includes a verification module 603 (It is not shown in the figure), the verification module is configured to: extract an entity word from associated entity words corresponding to the target entity word as a current associated entity word corresponding to the target entity word; count an access frequency or a number of access times of the target entity word and the current associated entity word corresponding to the target entity word in a predetermined time period; in response to the access frequency being greater than a preset frequency threshold or the number of access times being greater than a preset number of times threshold, determine that the current associated entity word corresponding to the target entity word is valid; and repeat the extracting, counting and determining operation until whether each of the associated entity words corresponding to the target entity word is valid is verified.

The apparatus for mining an entity relationship may execute the method provided in any embodiment of the present disclosure. The apparatus for mining an entity relationship has function modules for executing the method and corresponding beneficial effects. The technical details which are not described in detail in this embodiment may refer to the method for mining an entity relationship provided in any embodiment of the present disclosure.

Embodiment 6

According to an embodiment of the present disclosure an electronic device and a readable storage medium are provided.

Figure 9:
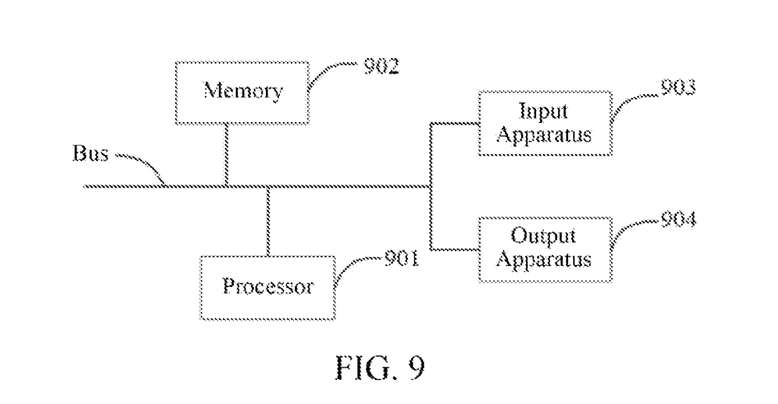
FIG. 9 is a schematic diagram of electronic devices used to implement the method for mining an entity relationship of an embodiment of the present disclosure.

As shown in FIG. 9, which is a block diagram of an electronic device of a method for mining an entity relationship according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 9, the electronic device includes: one or more processors 901, a memory 902, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 9, one processor 901 is used as an example.

The memory 902 is a non-transitory computer readable storage medium provided by an embodiment of the present disclosure. The memory stores instructions executable by at least one processor, so that the at least one processor performs the method for mining an entity relationship provided by embodiments of the present disclosure. The non-transitory computer readable storage medium of the present disclosure stores computer instructions for causing a computer to perform the method for mining an entity relationship provided by embodiments of the present disclosure.

The memory 902, as a non-transitory computer readable storage medium, may be used to store non-transitory software programs, non-transitory computer executable programs and modules, such as program instructions/modules corresponding to the method for mining an entity relationship in embodiments of the present disclosure (for example, the searching module 901 and the mining module 902 shown in FIG. 6). The processor 901 executes the non-transitory software programs, instructions, and modules stored in the memory 902 to execute various functional applications and data processing of the server, that is, to implement the method for mining an entity relationship in foregoing method embodiments.

The memory 902 may include a storage program area and a storage data area, where the storage program area may store an operating system and at least one function required application program; and the storage data area may store data created by the use of the electronic device according to the method for mining an entity relationship, etc. In addition, the memory 902 may include a high-speed random access memory, and may also include a non-transitory memory, such as at least one magnetic disk storage device, a flash memory device, or other non-transitory solid-state storage devices. In some embodiments, the memory 902 may optionally include memories remotely provided with respect to the processor 901, and these remote memories may be connected to the electronic device of the method for mining an entity relationship through a network. Examples of the above network include but are not limited to the Internet, intranet, local area network, mobile communication network, and combinations thereof.

The electronic device of the method for mining an entity relationship may further include: an input apparatus 903 and an output apparatus 904. The processor 901, the memory 902, the input apparatus 903, and the output apparatus 904 may be connected through a bus or in other methods. In FIG. 9, connection through a bus is used as an example.

The input apparatus 903 may receive input digital or character information, and generate key signal inputs related to user settings and function control of the electronic device of the method for mining an entity relationship, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of embodiments of the present disclosure, a query statement satisfying a preset condition corresponding to target entity word is searched in a query statement set first; if at least one query statement satisfying the preset condition corresponding to the target entity word is found in the query statement set, an associated entity word corresponding to the target entity word is mined out based on the query statement satisfying the preset condition corresponding to the target entity word. That is, embodiments of the present disclosure can mine out associated entity words corresponding to the target entity word in the query statement set. In the existing method for mining an entity relationship, a large amount of labor operation needs to be performed in the manual method, and the cost is too high; the use of high frequency tagging is highly dependent on the tags. Because embodiments of the present disclosure adopt the technical means of mining the target entity word based on the query statement set, and overcomes the technical problems in the prior art such as a large amount of labor operation needs to be performed in a manual method and the cost is too high, and high frequency tags manner relies heavily on tags. The technical solution provided by embodiments of the present disclosure may mine out the relationship between different entity words more accurately, thereby satisfying search requirements of users, and achieving the purpose of saving labor cost and improving mining efficiency. Moreover, the technical solution of embodiments of the present disclosure is simple and convenient to implement, convenient to popularize, and wider in application range.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A computer-implemented method for mining an entity relationship in a query statement set including a plurality of query statements, comprising:
    searching in the query statement set to obtain at least one first query statement in the query statement set, the at least one first query statement each satisfying a first sentence structure condition corresponding to a first target entity word; wherein, in response to determining that a first noun in a query statement is the first target entity word and there is only one another noun following the first target entity word in the query statement, determining that the query statement is a first query statement satisfying the first sentence structure condition corresponding to the first target entity word, determining the only one another noun following the first target entity word in the first query statement as a second level entity word, and determining the second level entity word as a child node of the first target entity word;
    mining in the at least one first query statement, to obtain at least one second level entity word corresponding to the first target entity word;
    merging the first target entity word and each second level entity word in the at least one second level entity word corresponding to the first target entity word to obtain a second target entity word, and searching in the query statement set to obtain a second query statement in the query statement set, the second query statement containing the second target entity word and satisfying a second sentence structure condition corresponding to the second target entity word; and
    mining in the second query statement, to obtain a third level entity word corresponding to the second target entity word, and determining the third level entity word as a child node of the second level entity word,
    wherein, in response to determining that a first noun in a query statement in the query statement set is the second target entity word and there is only one verb following the second target entity word, determining that the query statement is a second query statement satisfying the second sentence structure condition corresponding to the second target entity word, and determining the only one verb following the second target entity word as the third level entity word; and
    wherein the method further comprises,
    extracting an entity word from associated entity words corresponding to the first target entity word as a current associated entity word corresponding to the first target entity word;
    counting an access frequency or a number of access times of the first target entity word and the current associated entity word corresponding to the first target entity word in a predetermined time period;
    in response to the access frequency being greater than a preset frequency threshold or the number of access times being greater than a preset number of times threshold, determining that the current associated entity word corresponding to the first target entity word is valid;
    repeating the extracting, counting and determining operation until whether each of the associated entity words corresponding to the first target entity word is valid is verified.

2. The method according to the claim 1, wherein the searching in a query statement set to obtain the at least one first query statement, comprises:
    searching for the first target entity word in query statement set;
    in response to determining that at least one query statement including the first target entity word is found in the query statement set, detecting whether there is at least one query statement satisfying the first sentence structure condition corresponding to the first target entity word in the found at least one query statement including the first target entity word;
    in response to determining that there is at least one query statement satisfying the first sentence structure condition corresponding to the first target entity word in the at least one query statement including the first target entity word, determining that the at least one query statement satisfying the first sentence structure condition corresponding to the first target entity word is found in the query statement set.

3. The method according to the claim 2, wherein the detecting whether there is at least one query statement satisfying the first sentence structure condition corresponding to the first target entity word in the found at least one query statement including the first target entity word, comprises:
    extracting, from the at least one query statement including the first target entity word, a query statement as a current query statement including the first target entity word;
    in response to determining that a first noun in the current query statement including the first target entity word is the first target entity word and there is only one noun following the first target entity word, determining that the current query statement including the first target entity word is a first query statement satisfying the first sentence structure condition corresponding to the first target entity word;
    repeating the extracting and determining operation until whether each of the at least one query statement including the first target entity word satisfies the first sentence structure condition corresponding to the first target entity word is detected.

4. The method according to the claim 1, wherein searching in the query statement set to obtain the second query statement, comprises:
    searching for the second target entity word in the query statement set;
    in response to determining that at least one query statement including the second target entity word is found in the query statement set, detecting whether there is at least one query statement satisfying the second sentence structure condition corresponding to the second target entity word in the at least one query statement including the second target entity word;
    in response to determining that there is at least one query statement satisfying the second sentence structure condition corresponding to the second target entity word in the found at least one query statement including the second target entity word, determining that the at least one query statement satisfying the second sentence structure condition corresponding to the second target entity word is found in the query statement set.

5. The method according to the claim 1, wherein the mining, based on the at least one first query statement, at least one second level entity word corresponding to the first target entity word, comprises:
    extracting, from the at least one first query statement, a query statement as a current first query statement;

mining a second level entity word corresponding to the first target entity word based on the current first query statement;

repeating the extracting and mining operation until at least one second level entity word corresponding to the first target entity word is mined in each of the first query statements.

6. The method according to the claim 4, wherein the detecting whether there is at least one query statement satisfying the second sentence structure condition corresponding to the second target entity word in the found at least one query statement including the second target entity word, comprises:

extracting, from the at least one query statement including the second target entity word, a query statement as a current query statement including the second target entity word;

in response to determining that a first noun in the current query statement including the second target entity word is the second target entity word and there is only one another noun following the second target entity word in the current query statement, determining that the current query statement including the second target entity word is a second query statement satisfying the second sentence structure condition corresponding to the second target entity word, and determining the only one another noun following the second target entity word as the third level entity word;

repeating the extracting and determining operation until all of the query statements satisfying the second sentence structure corresponding to the second target entity word are extracted from the at least one query statement including the second target entity word.

7. An electronic device, comprising:

at least one processor; and a memory in communication with the at least one processor; wherein, the memory stores instructions executable by at least one processor, the instructions, when executed by the at least one processor, cause the at least one processor to perform operations for mining an entity relationship in a query statement set including a plurality of query statements, the operations comprising:

searching in the query statement set to obtain at least one first query statement in the query statement set, the at least one first query statement each satisfying a first sentence structure condition corresponding to a first target entity word; wherein, in response to determining that a first noun in a query statement is the first target entity word and there is only one another noun following the first target entity word in the query statement, determining that the query statement is a first query statement satisfying the first sentence structure condition corresponding to the first target entity word, determining the only one another noun following the first target entity word in the first query statement as a second level entity word, and determining the second level entity word as a child node of the first target entity word;

mining in the at least one first query statement, to obtain at least one second level entity word corresponding to the first target entity word;

merging the first target entity word and each second level entity word in the at least one second level entity word corresponding to the first target entity word to obtain a second target entity word, and searching in the query statement set to obtain a second query statement in the query statement set, the second query statement containing the second target entity word and satisfying a second sentence structure condition corresponding to the second target entity word; and mining in the second query statement, to obtain a third level entity word corresponding to the second target entity word, and determining the third level entity word as a child node of the second level entity word, wherein, in response to determining that a first noun in a query statement in the query statement set is the second target entity word and there is only one verb following the second target entity word, determining that the query statement is a second query statement satisfying the second sentence structure condition corresponding to the second target entity word, and determining the only one verb following the second target entity word as the third level entity word; and wherein the operations further comprise:

extracting an entity word from associated entity words corresponding to the first target entity word as a current associated entity word corresponding to the first target entity word;

counting an access frequency or a number of access times of the first target entity word and the current associated entity word corresponding to the first target entity word in a predetermined time period;

in response to the access frequency being greater than a preset frequency threshold or the number of access times being greater than a preset number of times threshold, determining that the current associated entity word corresponding to the first target entity word is valid;

repeating the extracting, counting and determining operation until whether each of the associated entity words corresponding to the first target entity word is valid is verified.

8. The electronic device according to claim 7, wherein the searching in a query statement set to obtain the at least one first query statement, comprises:

searching for the first target entity word in query statement set;

in response to determining that at least one query statement including the first target entity word is found in the query statement set, detecting whether there is at least one query statement satisfying the first sentence structure condition corresponding to the first target entity word in the found at least one query statement including the first target entity word;

in response to determining that there is at least one query statement satisfying the first sentence structure condition corresponding to the first target entity word in the at least one query statement including the first target entity word, determining that the at least one query statement satisfying the first sentence structure condition corresponding to the first target entity word is found in the query statement set.

9. The electronic device according to claim 8, wherein the detecting whether there is at least one query statement satisfying the first sentence structure condition corresponding to the first target entity word in the found at least one query statement including the first target entity word, comprises:

extracting, from the at least one query statement including the first target entity word, a query statement as a current query statement including the first target entity word;

in response to determining that a first noun in the current query statement including the first target entity word is the first target entity word and there is only one noun following the first target entity word, determining that the current query statement including the first target entity word is a first query statement satisfying the first sentence structure condition corresponding to the first target entity word;

repeating the extracting and determining operation until whether each of the at least one query statement including the first target entity word satisfies the first sentence structure condition corresponding to the first target entity word is detected.

10. The electronic device according to claim 7, wherein searching in the query statement set to obtain the second query statement, comprises:

searching for the second target entity word in the query statement set;

in response to determining that at least one query statement including the second target entity word is found in the query statement set, detecting whether there is at least one query statement satisfying the second sentence structure condition corresponding to the second target entity word in the at least one query statement including the second target entity word;

in response to determining that there is at least one query statement satisfying the second sentence structure condition corresponding to the second target entity word in the found at least one query statement including the second target entity word, determining that the at least one query statement satisfying the second sentence structure condition corresponding to the second target entity word is found in the query statement set.

11. The electronic device according to claim 7, wherein the mining, based on the at least one first query statement, at least one second level entity word corresponding to the first target entity word, comprises:

extracting, from the at least one first query statement, a query statement as a current first query statement;

mining a second level entity word corresponding to the first target entity word based on the current first query statement;

repeating the extracting and mining operation until at least one second level entity word corresponding to the first target entity word is mined in each of the first query statements.

12. The electronic device according to claim 10, wherein the detecting whether there is at least one query statement satisfying the second sentence structure condition corresponding to the second target entity word in the found at least one query statement including the second target entity word, comprises:

extracting, from the at least one query statement including the second target entity word, a query statement as a current query statement including the second target entity word;

in response to determining that a first noun in the current query statement including the second target entity word is the second target entity word and there is only one another noun following the second target entity word in the current query statement, determining that the current query statement including the second target entity word is a second query statement satisfying the second sentence structure condition corresponding to the second target entity word, and determining the only one another noun following the second target entity word as the third level entity word;

repeating the extracting and determining operation until all of the query statements satisfying the second sentence structure corresponding to the second target entity word are extracted from the at least one query statement including the second target entity word.

13. A non-transitory computer-readable storage medium, storing computer instructions thereon, wherein the computer instructions, when executed by a processor, cause the processor to perform operations for mining an entity relationship in a query statement set including a plurality of query statements, the operations comprising:

searching in the query statement set to obtain at least one first query statement in the query statement set, the at least one first query statement each satisfying a first sentence structure condition corresponding to a first target entity word; wherein, in response to determining that a first noun in a query statement is the first target entity word and there is only one another noun following the first target entity word in the query statement, determining that the query statement is a first query statement satisfying the first sentence structure condition corresponding to the first target entity word, determining the only one another noun following the first target entity word in the first query statement as a second level entity word, and determining the second level entity word as a child node of the first target entity word;

mining in the at least one first query statement, to obtain at least one second level entity word corresponding to the first target entity word;

merging the first target entity word and each second level entity word in the at least one second level entity word corresponding to the first target entity word to obtain a second target entity word, and searching in the query statement set to obtain a second query statement in the query statement set, the second query statement containing the second target entity word and satisfying a second sentence structure condition corresponding to the second target entity word; and mining in the second query statement, to obtain a third level entity word corresponding to the second target entity word, and determining the third level entity word as a child node of the second level entity word, wherein the method further comprises:

in response to determining that a second query statement satisfying the second sentence structure condition corresponding to the second target entity word is not found in the query statement set, determining the second level entity word as a leaf node of the first target entity word; and constructing an entity layer structure based on the first target entity word as parent node, the second level entity word, and the third level entity word; and wherein the operations further comprise:

extracting an entity word from associated entity words corresponding to the first target entity word as a current associated entity word corresponding to the first target entity word;

counting an access frequency or a number of access times of the first target entity word and the current associated entity word corresponding to the first target entity word in a predetermined time period;

in response to the access frequency being greater than a preset frequency threshold or the number of access times being greater than a preset number of times threshold, determining that the current associated entity word corresponding to the first target entity word is valid;

repeating the extracting, counting and determining operation until whether each of the associated entity words corresponding to the first target entity word is valid is verified.

14. The method according to claim 1, wherein the method further comprises:

in response to determining that a second query statement satisfying the second sentence structure condition corresponding to the second target entity word is not found in the query statement set, determining the second level entity word as a leaf node of the first target entity word; and constructing an entity layer structure based on the first target entity word as parent node, the second level entity word, and the third level entity word.

15. The method according to claim 1, wherein the merging the first target entity word and each second level entity word in the at least one second level entity word corresponding to the first target entity word to obtain a second target entity word, comprises:

adding a predetermined function word between the first target entity word and each second level entity word in the at least one second level entity word corresponding to the target entity word to obtain the second target entity word.

16. The method according to claim 1, wherein the merging the target entity word and each second level entity word corresponding to the target entity word to obtain a second target entity word, comprises:

directly combine the first target entity word and each second level entity word corresponding to the target entity word to obtain the second target entity word.

* * * * *